(12) United States Patent
Hirakawa

(10) Patent No.: US 7,717,796 B2
(45) Date of Patent: May 18, 2010

(54) SHOCK ABSORBING STRUCTURE OF PROPELLER SHAFT

(75) Inventor: Junichi Hirakawa, Haga-gun (JP)

(73) Assignee: Showa Corporation, Saitama (JP)

( * ) Notice: Subject to any disclaimer, the term of this patent is extended or adjusted under 35 U.S.C. 154(b) by 363 days.

(21) Appl. No.: 11/442,772

(22) Filed: May 30, 2006

(65) Prior Publication Data

US 2007/0123359 A1 May 31, 2007

(30) Foreign Application Priority Data

Nov. 30, 2005 (JP) ............................. 2005-345976

(51) Int. Cl.
*F16D 3/205* (2006.01)
(52) U.S. Cl. ...................... 464/182; 464/905
(58) Field of Classification Search ................ 464/111, 464/182, 905, 906; 280/777
See application file for complete search history.

(56) References Cited

U.S. PATENT DOCUMENTS 5,779,551 A * 7/1998 Stall et al. .................. 464/111

6,379,255 B1 4/2002 Cermak et al.
2005/0107169 A1* 5/2005 Sakurai et al.

FOREIGN PATENT DOCUMENTS

JP 10-250390 9/1998

* cited by examiner

*Primary Examiner*—Greg Binda
(74) *Attorney, Agent, or Firm*—Osha • Liang LLP

(57) ABSTRACT

When an inner ring portion of a tripod is brought into contact with a protruding portion, the inner ring portion is brought into contact with the protruding portion because an outer diameter of the protruding portion is smaller than a diameter of a tilted outer end portion of the inner ring portion. Since the inner ring portion is tilted with respect to an axial direction, the inner ring portion is brought into contact with the protruding portion by a point (a line) not by a surface. If the inner ring portion is brought into contact with the protruding portion by the point, a stress concentration is generated at the point with which the protruding portion is brought into contact, a small impact force overcomes a breaking load of the protruding portion in the stress concentration portion, and the stress concentration portion is easily broken (plastically deformed). Accordingly, it is possible to easily break the protruding portion, and even if there is a dimensional error of the protruding portion or the like, it is possible to make a load breaking the protruding portion approximately constant.

12 Claims, 4 Drawing Sheets

SHOCK ABSORBING STRUCTURE OF PROPELLER SHAFT

BACKGROUND OF THE INVENTION

1. Field of the Invention

The present invention relates to a shock absorbing structure of a propeller shaft used for a vehicle or the like.

2. Description of the Related Art

In a conventional shock absorbing structure of a propeller shaft, there is a structure in which an outer race of a tripod universal joint is formed in a rear end of a first propeller shaft, an inner shaft portion is formed in a front portion of a coupling member, tripods corresponding to three bearings protruding in a radial direction is spline fitted to a leading end portion of the inner shaft portion, and the respective tripods are slidably fitted to three grooves formed on a cylindrical inner peripheral surface of the outer race while being directed in an axial direction so as to structure the tripod universal joint, thereby executing a power transmission at a constant velocity (refer to Japanese Patent Application Laid-open No. 10-250390 (patent document 1)). A protruding portion for positioning an inner ring portion of the tripod is formed in the inner shaft portion, the tripod pressed by the outer race comes into collision with the protruding portion so as to break the protruding portion in a predetermined case, and the tripod slides on the inner shaft portion and the coupling member, thereby absorbing a shock.

In this case, in the shock absorbing structure of the propeller shaft mentioned above, a thickness of the protruding portion is small, and in the case that an induction hardening is applied, there is a risk that the protruding portion gets chipped or is broken at a time of carrying the coupling member or assembling the propeller shaft. Further, there is a problem that a crack is generated in the protruding portion at a time of hardening. Further, when the tripod pressed by the outer race is brought into contact with the protruding portion and comes into collision with the protruding portion, the tripod and the protruding portion are brought into contact with each other and the protruding portion is broken. Accordingly, there is a problem that a dispersion is generated in a breaking load of the protruding portion due to a dimensional error of the thickness of the protruding portion, a dimensional error of the tripod, an error of a fitting frictional force of the tripod with respect to the inner shaft, or the like.

SUMMARY OF THE INVENTION

Accordingly, the present invention is made by taking the circumstances mentioned above into consideration, and an object of the present invention is to provide a shock absorbing structure of a propeller shaft which can prevent a chip, a crack, a fracture and the like of the protruding portion, and can stabilize a breaking load of the protruding portion.

The present invention relates to a shock absorbing structure of a propeller shaft transmitting a driving force in an internal combustion engine side to a drive wheel side, comprising: a first propeller shaft positioned in the internal combustion engine side; a second propeller shaft positioned in the drive wheel side; a coupling shaft coupling the first propeller shaft and the second propeller shaft; a joint member having an inner ring portion tilted with respect to an axial direction in an inner diameter side, provided with the inner ring portion so as to be spline fitted to an outer periphery of the coupling shaft and transmitting a rotating force of the first propeller shaft to the second propeller shaft; and a protruding portion provided in an outer periphery of the coupling shaft and capable of being contacted with the joint member on the basis of a sliding motion on the coupling shaft. An outer diameter of the protruding portion is smaller than a diameter of a tile outer end portion of the inner ring portion.

In this case, in the present specification, the description "tilting angle" means a tilting angle of the propeller shaft (a coupling shaft) with respect to an axial direction.

In accordance with the present invention, it is possible to prevent a chip, a crack, a fracture and the like of the protruding portion, and it is possible to stabilize a breaking load of the protruding portion.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Next, a description will be given of a shock absorbing structure of a propeller shaft in accordance with an embodiment of the present invention with reference to the accompanying drawings.

Figure 1:
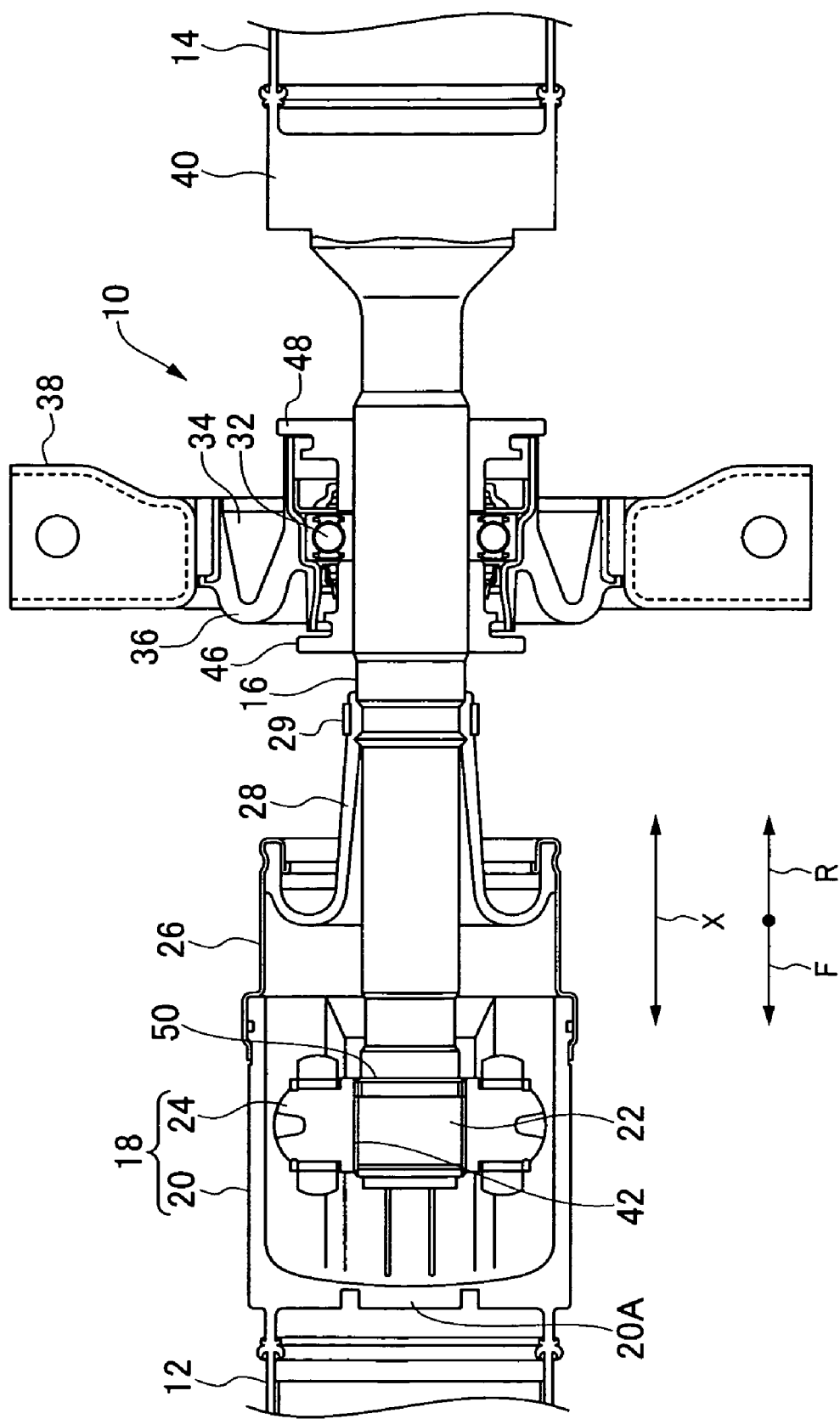
FIG. 1 is a view of a partial structure of a shock absorbing structure of a propeller shaft in accordance with an embodiment of the present invention before an impact force is applied.
Figure 2:
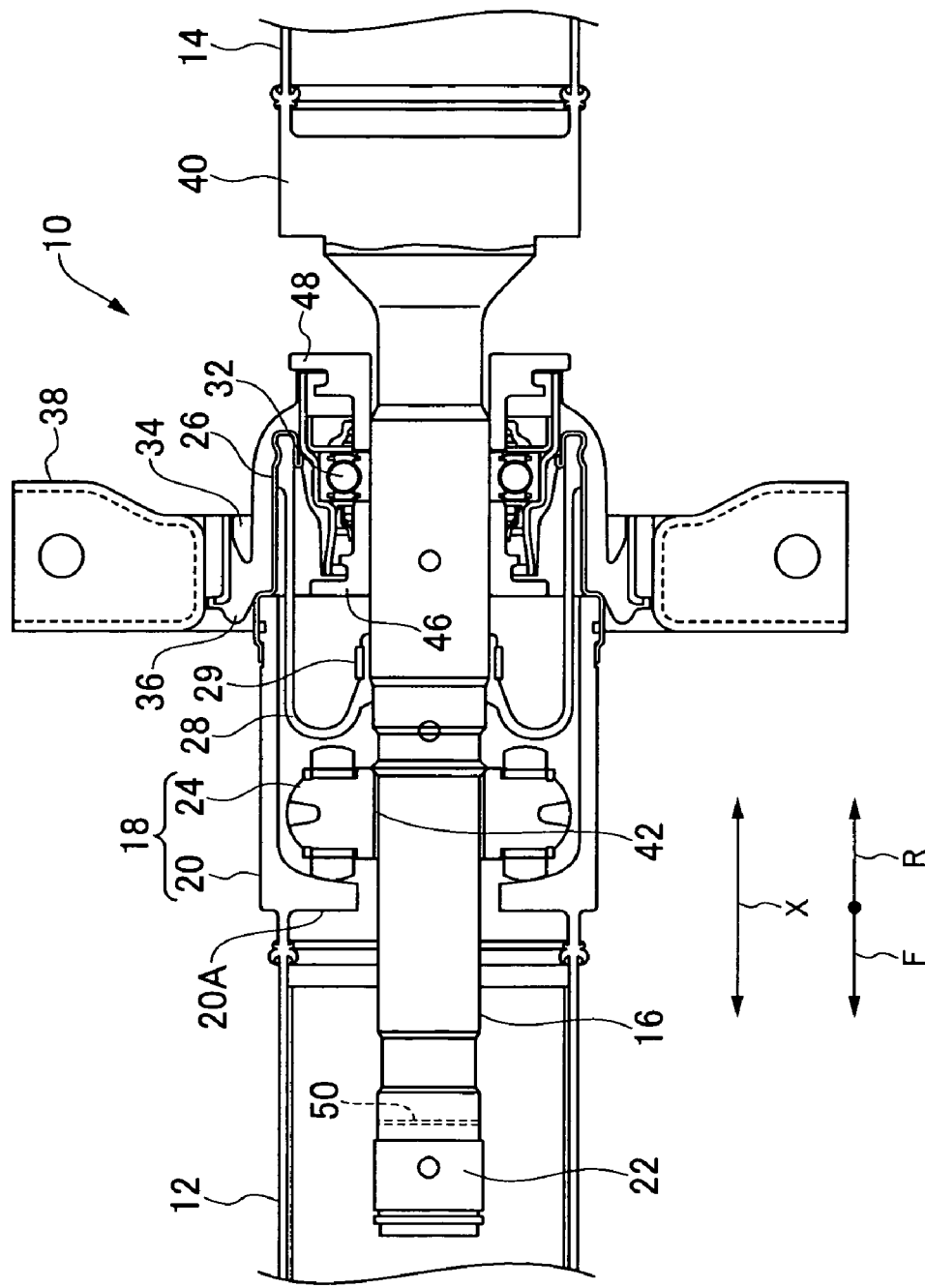
FIG. 2 is a view of a partial structure of the shock absorbing structure of the propeller shaft in accordance with the embodiment of the present invention after the impact force is applied.

As shown in FIGS. 1 and 2, a shock absorbing structure 10 of a propeller shaft in accordance with the present embodiment is provided with an approximately cylindrical first propeller shaft 12 positioned in an internal combustion engine side of an FF base. One end (a front end) of the first propeller shaft 12 is coupled to an output side of the internal combustion engine via a cross joint (not shown).

Further, the shock absorbing structure 10 of the propeller shaft is provided with an approximately cylindrical second propeller shaft 14 positioned in a rear wheel side. A rear end of the second propeller shaft 14 is coupled to a differential gear (not shown) via a universal joint (not shown). Further, a coupling shaft 16 is provided between the first propeller shaft 12 and the second propeller shaft 14. The coupling shaft 16 forms a propeller shaft in the same manner as the first propeller shaft 12 and the second propeller shaft 14 and couples both the elements.

An outer race 20 of a tripod universal joint 18 is formed in the other end (a rear end) of the first propeller shaft 12. Further, an inner shaft portion 22 is formed in a front portion of the coupling shaft 16. Three tripods 24 corresponding to three bearings protruding radially are provided in the inner shaft portion 22, and the respective tripods 24 are slidably fitted to three grooves (not shown) formed in an inner peripheral surface of the outer race 20 along an axial direction (a direction of an arrow X in FIG. 1) so as to structure the tripod universal joint 18, whereby a power transmission at a constant velocity is achieved.

Further, the outer race 20 is formed in a closed-end cylindrical shape, and an opening in an opposite side to a bottom wall 20A of the outer race 20 is attached to an adapter 26. Further, one side end portion of a boot 28 is attached to the adapter 26. Further, the other side end portion (a shaft side end portion) of the boot 28 is firmly fixed to the coupling shaft 16 by a boot band 29.

Further, the coupling shaft 16 is rotatably supported by a center bearing 32. The center bearing 32 is supported by an annular elastic body 36 of an annular support member 34, and the annular support member 34 is supported to a bracket 38 fixed to a vehicle body side.

As mentioned above, the coupling shaft 16 is supported to the vehicle body side by the annular support member 34 and the center bearing 32, and a rear side expanded portion 40 having an enlarged diameter is formed in a rear side (in a direction of an arrow R in FIG. 1) thereof. A front end of the second propeller shaft 14 is friction welded to the rear side expanded portion 40.

Figure 3:
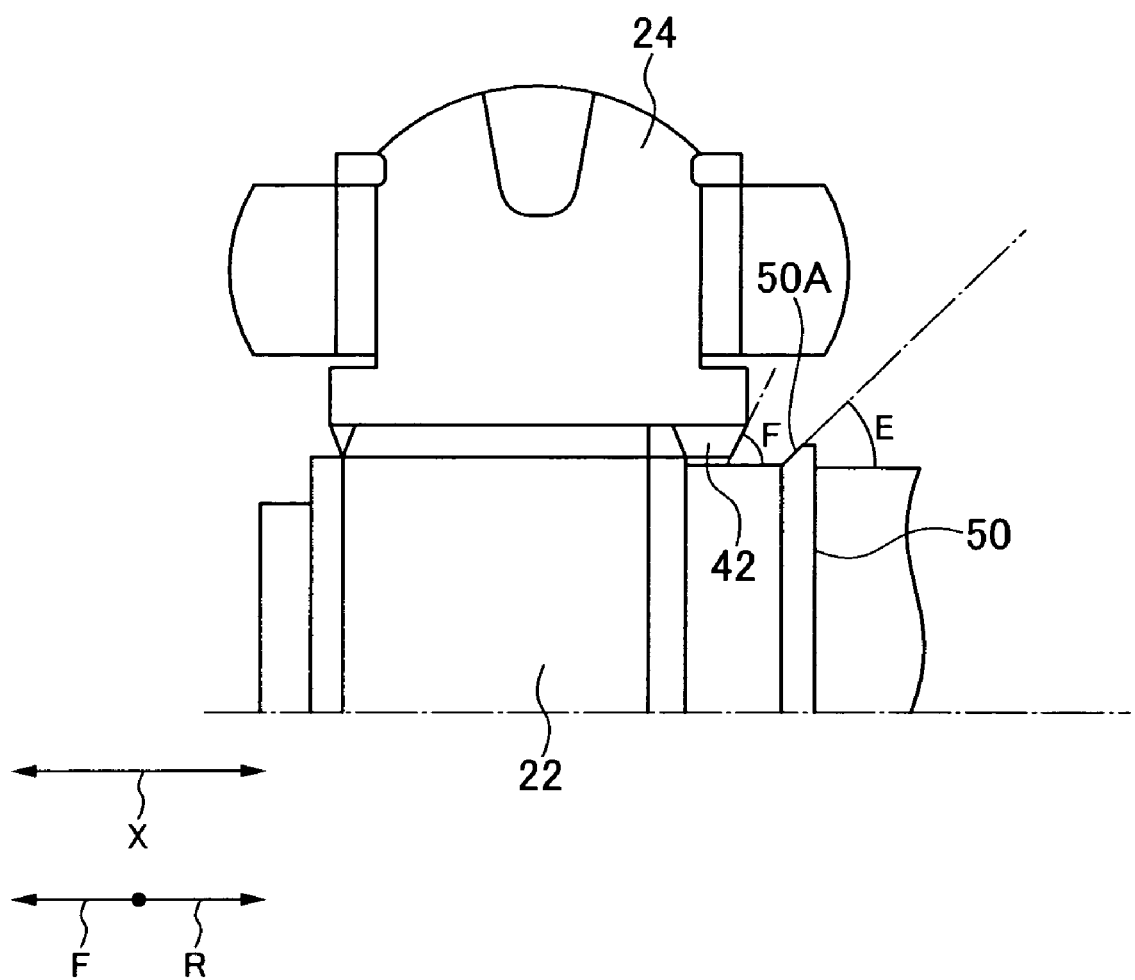
FIG. 3 is an enlarged view of a main portion of the shock absorbing structure of the propeller shaft in accordance with the embodiment of the present invention.
Figure 4:
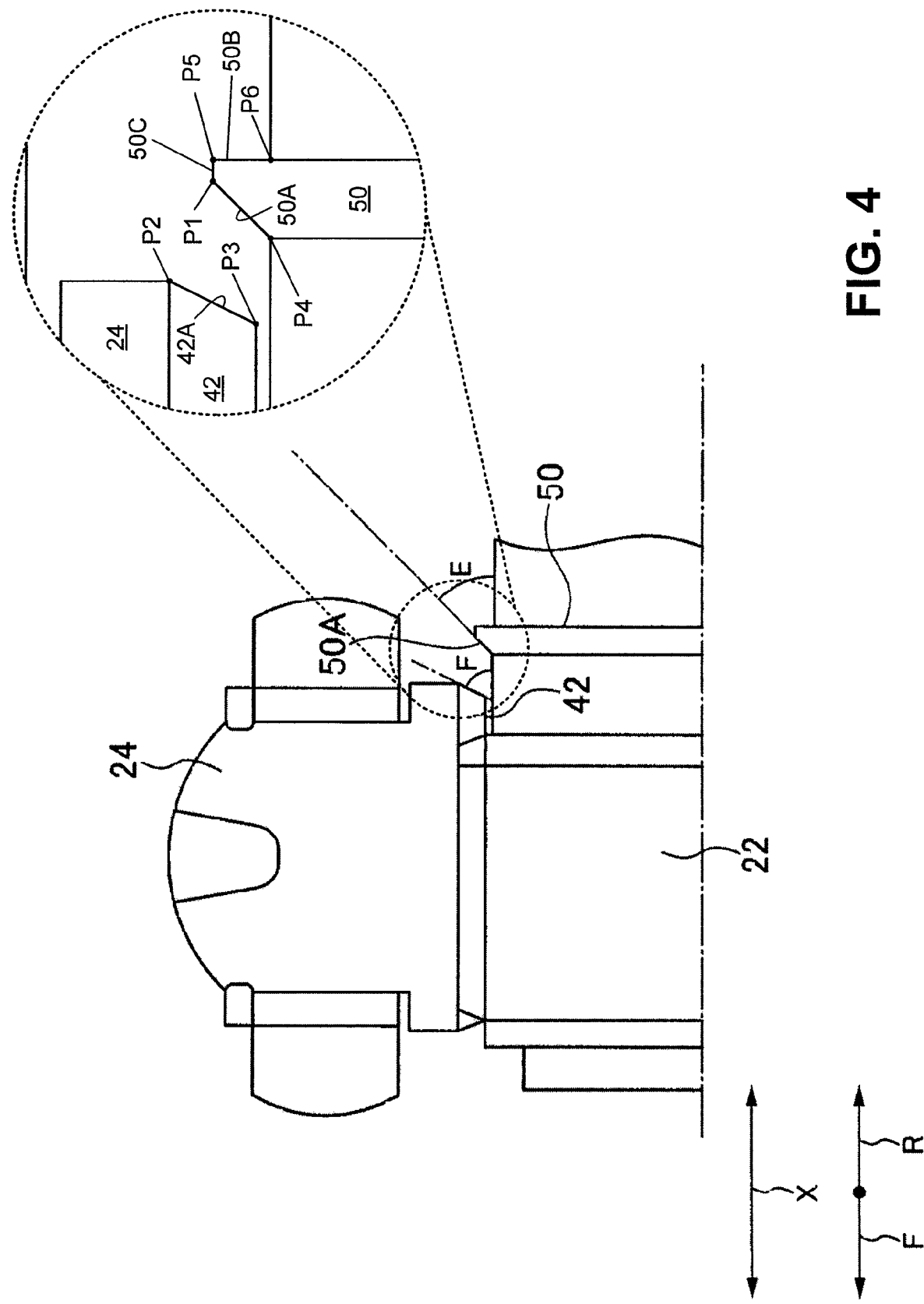
FIG. 4 is the view of the main portion of the shock absorbing structure of the propeller shaft as shown in FIG. 3 having a portion enlarged to clearly show additional reference numerals.

Further, as shown in FIG. 3, the tripod 24 constituting the tripod universal joint 18 is structured such that an inner ring portion 42 is spline fitted to the inner shaft portion 22, and the tripod 24 integrally rotates together with the rotation of the inner shaft portion 22. Both ends in an axial direction of the inner ring portion 42 are tilted with respect to an axial direction and are formed in such a manner that a length in an axial direction is narrowed toward an inner side from an outer side in a diametrical direction. Further, when the tripod 24 is fitted to the groove in the inner peripheral surface of the outer race 20 and is inserted into the outer race 20 together with the inner shaft portion 22, there is obtained a state in which the bottom wall 20A of the outer race 20 faces to a front side (a direction of an arrow F in FIG. 1) of the inner shaft portion 22 and the tripod 24.

Further, as shown in FIG. 1, stopper pieces 46 and 48 made of a metal are provided in one side and the other side in an axial direction of the center bearing 32. Each of the stopper pieces 46 and 48 is formed in an annular shape, and each of the stopper pieces 46 and 48 is pressed into the coupling shaft 16 so as to be held.

A description will be given here of a main portion of the present invention.

As shown in FIGS. 1 to 4, a protruding portion 50 is provided in the second propeller shaft 14 side of the tripod 24 provided on the inner shaft portion 22. The protruding portion 50 is integrally formed in an outer periphery of the coupling shaft 16, and protrudes to an outer periphery of the coupling shaft 16. Further, an outer diameter of the protruding portion 50 (which those skilled in the art will appreciate is twice the distance (radius) from point P1 to the central axis) is set so as to be smaller than an inner diameter of the tripod 24 (that is, a diameter of a tilted outer end portion of the inner ring portion 42 or, as those skilled in the art will appreciate, twice the distance (radius) from point P2 to the central axis). Further, a tilted portion 50A (refer to FIG. 3) tilted with respect to the axial direction is formed in the tripod 24 side of the protruding portion 50. The tilted portion 50A of the protruding portion 50 constitutes a first surface (between points P1 and P4) that faces the tilted surface 42A (between points P2 and P3) of the inner ring portion 42. Additionally, the protruding portion 50 includes a second surface 50B (between points P5 and P6) on the opposite side of the protruding portion from the first face, and a plateau 50C (between points P1 and P5) that extends between the first and second surfaces. As those skilled in the art will readily appreciate, the length of the plateau 50C is shorter than that of the first surface 50A in the axial direction.

Further, a tilting angle in the tilted portion 50A of the protruding portion 50 is set so as to be smaller than a tilting angle of the inner ring portion 42. In other words, it is set such as to satisfy a relation E<F, on the assumption that a tilting angle in the tilted portion 50A of the protruding portion 50 is set to E, and a tilting angle of the inner ring portion 42 is set to F.

Next, a description will be given of an operation of the shock absorbing structure 10 of the propeller shaft in accordance with the present embodiment. A description will be given below of a state in which an impact force is not applied to the propeller shaft (a state shown in FIG. 1) as an initial state.

As shown in FIG. 1, for example, if the impact force is applied to the second propeller shaft 14 side from the first propeller shaft 12 side, the first propeller shaft 12 moves to the second propeller shaft 14 side. If the first propeller shaft 12 moves to the second propeller shaft 14 side, a bottom portion of the outer race 20 comes into collision with a leading end portion of the inner shaft portion 22 in due course. Further, the leading end portion of the inner shaft portion 22 bursts through the bottom portion of the outer race 20, and the inner shaft portion 22 is inserted to the inner portion of the first propeller shaft 12 together with the coupling shaft 16.

At this time, the tripod 24 and the inner ring portion 42 provided in the outer periphery of the inner shaft portion 22 are pressed to the bottom portion of the outer race 20, and slide on the inner shaft portion 22 and the coupling shaft 16 toward the second propeller shaft 14 side. If the tripod 24 and the inner ring portion 42 slide on the inner shaft portion 22 and the coupling shaft 16, they come into collision with the protruding portion 50 in due course.

In this case, when the tripod 24 and the inner ring portion 42 are brought into contact with the protruding portion 50, the tilted surface region of the inner ring portion 42 is brought into contact with the protruding portion 50 because the outer diameter of the protruding portion 50 is smaller than the inner diameter of the tripod 24 (that is, the diameter of the tilted outer end portion of the inner ring portion 42). Since the inner ring portion 42 is tilted with respect to the axial direction, the tilted surface of the inner ring portion 42 is brought into contact with the corner portion of the protruding portion 50, for example, at the point P3, by a point (including a line) not by a surface, that is, the inner ring portion 42 is brought into contact with the protruding portion 50. If the inner ring portion 42 is brought into contact with the protruding portion 50 by the point, a stress concentration is generated at the point with which the protruding portion is brought into contact. If the stress concentration is generated in the protruding portion 50, a little impact force gets over a breaking (plastically deforming) load of the protruding portion 50 in the stress concentration portion, and the stress concentration portion is easily broken (deformed). Accordingly, it is possible to easily break the protruding portion 50, and even if there is generated a dimensional error of the protruding portion 50, a dimensional error of the tripod 24 and the inner ring portion 42, an error of the friction force applied to the tripod 24 and the coupling shaft 16 of the inner ring portion 42, or the like, it is possible to make a load (an impact force) breaking the protruding portion 50 approximately constant. Further, since the outer diameter of the protruding portion 50 is smaller than the inner diameter of the tripod 24, it is possible to make a protruding amount at which the protruding portion 50 protrudes in the diametrical direction of the coupling shaft 16 to be small. Accordingly, it is possible to prevent the protruding portion 50 from being chipped or broken at a time of carrying the coupling shaft 16 or assembling the propeller shaft, it is possible to prevent the crack from being generated in the protruding portion 50 at a time of hardening the protruding portion 50, and a workability is improved.

Further, since the tilted portion 50A tilted with respect to the axial direction is formed at a position which is brought into contact with the inner ring portion 42 of the protruding portion 50, a volume of the protruding portion 50 protruding from the outer periphery of the coupling shaft 16 becomes small, whereby a rigidity of the protruding portion 50 is lowered. Therefore, it is possible to lower the breaking load of the protruding portion 50. As a result, the protruding portion 50 is further easily broken and deformed, and it is possible to further stabilize the load (the impact force) breaking the protruding portion 50.

Particularly, since the tilting angle in the tilted portion 50A of the protruding portion 50 is smaller than the tilting angle of the inner ring portion 42, it is possible to change the position of the load applying point (line) in the radial direction at which the tilted portion of the inner ring portion 42 is brought into contact with the tilted portion 50A of the protruding portion 50 in the diametrical direction. Accordingly, since the tilt surface of the inner ring portion 42 is securely brought into contact with the protruding portion 50 by the point and it is possible to apply the impact load to the predetermined radial position, it is possible to securely generate the stress concentration in the protruding portion 50. Further, it is possible to set and adjust the breaking load of the protruding portion 50 to a predetermined value, and it is easy to intend to make the parts in common use. As a result, the protruding portion 50 is easily broken, and it is possible to further stabilize the load (the impact force) breaking the protruding portion 50.

In this case, as shown in FIG. 2, since the protruding portion 50 is broken, and the tripod 24 and the inner ring portion 42 slide to the second propeller shaft 14 side on the coupling shaft 16, the impact force applied to the first propeller shaft 12 from the external portion is absorbed and reduced by the slide friction force applied to the tripod 24 and the coupling shaft 16 of the inner ring portion 42.

As mentioned above, the present invention relates to a shock absorbing structure 10 of a propeller shaft transmitting a driving force in an internal combustion engine side to a drive wheel side, comprising: a first propeller shaft 12 positioned in the internal combustion engine side; a second propeller shaft 14 positioned in the drive wheel side; a coupling shaft coupling the first propeller shaft 12 and the second propeller shaft 14; a joint member having an inner ring portion 42 tilted with respect to an axial direction in an inner diameter side, provided with the inner ring portion 42 so as to be spline fitted to an outer periphery of the coupling shaft and transmitting a rotating force of the first propeller shaft 12 to the second propeller shaft 14; and a protruding portion 50 provided in an outer periphery of the coupling shaft and capable of being contacted with the joint member on the basis of a sliding motion on the coupling shaft. An outer diameter of the protruding portion 50 is smaller than a diameter of a tile outer end portion of the inner ring portion 42.

Therefore, in accordance with the present invention, for example, if the first propeller shaft 12 comes into collision with the joint member and a predetermined pressure is applied, the joint member slides on the coupling shaft in the axial direction together with the first propeller shaft 12, and is brought into contact with and comes into collision with the protruding portion 50. Further, since the protruding portion 50 is broken, and the joint member slides in the axial direction on the coupling shaft together with the first propeller shaft 12, the shock is absorbed and reduce by the friction force.

In this case, when the joint member is brought into contact with the protruding portion 50, the tilt surface in the inner ring portion 42 of the joint member is brought into contact with the protruding portion 50 because the outer diameter of the protruding portion 50 is smaller than the diameter of the tilted outer end portion of the inner ring portion 42 in the joint member. Since the inner ring portion 42 is tilted with respect to the axial direction, the tilt surface of the inner ring portion 42 is brought into contact with the corner portion of the protruding portion 50 by a point (including a line) not by a surface, that is, the inner ring portion 42 is brought into contact with the protruding portion 50. If the inner ring portion 42 is brought into contact with the protruding portion 50 by the point, a stress concentration is generated at the point with which the protruding portion 50 is brought into contact. If the stress concentration is generated in the protruding portion 50, a little impact force gets over a breaking load of the protruding portion 50 in the stress concentration portion, and the stress concentration portion is easily broken (including a plastic deformation). Accordingly, it is possible to easily break the protruding portion 50, and even if there is generated a dimensional error of the protruding portion 50, a dimensional error of the joint member, an error of the friction force applied to the coupling shaft of the joint member, or the like, it is possible to make a load (an impact force) breaking the protruding portion 50 approximately constant. Further, since the outer diameter of the protruding portion 50 is smaller than the diameter of the tilted outer end portion of the inner ring portion 42 in the joint member, it is possible to make a protruding amount at which the protruding portion 50 protrudes in the diametrical direction of the coupling shaft to be small. Accordingly, it is possible to prevent the protruding portion 50 from being chipped or broken at a time of carrying the coupling shaft or assembling the propeller shaft, and it is possible to prevent the crack from being generated in the protruding portion 50 at a time of hardening the protruding portion 50.

Further, in accordance with the present invention, in the shock absorbing structure 10 of the propeller shaft mentioned above, a tilted portion 50A tilted with respect to the axial direction is formed at a position which is brought into contact with the inner ring portion 42 of the protruding portion 50.

Therefore, in accordance with the present invention, since the tilted portion 50A tilted with respect to the axial direction is formed in the position which is brought into contact with the inner ring portion 42 of the protruding portion 50, the volume protruding from the outer periphery of the coupling shaft of the protruding portion 50 becomes small, whereby a rigidity of the protruding portion 50 is lowered. Accordingly, it is possible to lower the breaking load of the protruding portion 50 more and more. As a result, the protruding portion 50 is further easily broken, and it is possible to further stabilize the load (the impact force) breaking (plastically deforming) the protruding portion 50.

Further, in accordance with the present invention, in the shock absorbing structure 10 of the propeller shaft mentioned above, a tilting angle in the tilted portion 50A of the protruding portion 50 is smaller than a tilting angle of the inner ring portion 42.

Therefore, in accordance with the present invention, since the tilting angle in the tilted portion 50A of the protruding portion 50 is smaller than the tilting angle of the inner ring portion 42, it is possible to adjust the position of the load applying line in the radial direction at which the tilt surface of the inner ring portion 42 is first brought into contact with the tilt surface of the protruding portion 50 at a time when the inner ring portion 42 is brought into contact with the protruding portion 50. Accordingly, since the tilt surface of the inner ring portion 42 is securely brought into contact with the tilt surface of the protruding portion 50 at the predetermined radial position by the point (or the line), it is possible to securely generate the stress concentration in the protruding portion 50 at the predetermined radial position. As a result, it is possible to make the breaking load of the protruding portion 50 adjustable, it is possible to easily set the load (the impact force) breaking the protruding portion 50, and it is possible to further stabilize the load (the impact force) breaking the protruding portion 50.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A shock absorbing structure of a propeller shaft transmitting a driving force in an internal combustion engine side to a drive wheel side, comprising:
   a first propeller shaft positioned in the internal combustion engine side;
   a second propeller shaft positioned in the drive wheel side;
   a coupling shaft coupling the first propeller shaft and the second propeller shaft;
   a joint member having an inner ring portion, the joint member being spline fitted to an outer periphery of the coupling shaft so as to transmit a rotating force of the first propeller shaft to the second propeller shaft, and the inner ring portion comprising a tilted surface tilted with respect to an axial direction; and
   a protruding portion arranged on an outer periphery of the coupling shaft, the protruding portion comprising a first surface that faces the tilted surface of the inner ring portion, a second surface on the opposite side of the protruding portion from the first face, and a plateau between the first and second surfaces,
   wherein a length of the plateau is shorter than that of the first surface in the axial direction,
   wherein the protruding portion is engagable with the tilted surface of the inner ring portion due to a sliding motion of the joint member on the coupling shaft, and
   wherein an outer diameter of the protruding portion is smaller than an outer diameter of the inner ring portion such that the tilted surface of the inner ring portion is brought into contact with a corner portion of the protruding portion when an impact force is applied to the shock absorbing structure.

2. The shock absorbing structure of a propeller shaft as claimed in claim 1, wherein the first surface of the protruding portion is tilted with respect to the axial direction.

3. The shock absorbing structure of a propeller shaft as claimed in claim 2, wherein a tilting angle in the tilted surface of the protruding portion is smaller than a tilting angle in the tilted surface of the inner ring portion.

4. The shock absorbing structure of a propeller shaft as claimed in claim 3, wherein the protruding portion is integrally formed in an outer periphery of the coupling shaft.

5. The shock absorbing structure of a propeller shaft as claimed in claim 4, wherein the joint member comprises tripods radially protruding from an inner shaft portion formed in one end portion of the coupling shaft, and the respective tripods are slidably fitted to grooves formed in an inner peripheral surface of an outer race formed in the first propeller shaft along the axial direction so as to form a tripod universal joint.

6. The shock absorbing structure of a propeller shaft as claimed in claim 3, wherein the joint member comprises tripods radially protruding from an inner shaft portion formed in one end portion of the coupling shaft, and the respective tripods are slidably fitted to grooves formed in an inner peripheral surface of an outer race formed in the first propeller shaft along the axial direction so as to form a tripod universal joint.

7. The shock absorbing structure of a propeller shaft as claimed in claim 2, wherein the protruding portion is integrally formed in an outer periphery of the coupling shaft.

8. The shock absorbing structure of a propeller shaft as claimed in claim 7, wherein the joint member comprises tripods radially protruding from an inner shaft portion formed in one end portion of the coupling shaft, and the respective tripods are slidably fitted to grooves formed in an inner peripheral surface of an outer race formed in the first propeller shaft along the axial direction so as to form a tripod universal joint.

9. The shock absorbing structure of a propeller shaft as claimed in claim 2, wherein the joint member comprises tripods radially protruding from an inner shaft portion formed in one end portion of the coupling shaft, and the respective tripods are slidably fitted to grooves formed in an inner peripheral surface of an outer race formed in the first propeller shaft along the axial direction so as to form a tripod universal joint.

10. The shock absorbing structure of a propeller shaft as claimed in claim 1, wherein the protruding portion is integrally formed in an outer periphery of the coupling shaft.

11. The shock absorbing structure of a propeller shaft as claimed in claim 10, wherein the joint member comprises tripods radially protruding from an inner shaft portion formed in one end portion of the coupling shaft, and the respective tripods are slidably fitted to grooves formed in an inner peripheral surface of an outer race formed in the first propeller shaft along the axial direction so as to form a tripod universal joint.

12. The shock absorbing structure of a propeller shaft as claimed in claim 1, wherein the joint member comprises tripods radially protruding from an inner shaft portion formed in one end portion of the coupling shaft, and the respective tripods are slidably fitted to grooves formed in an inner peripheral surface of an outer race formed in the first propeller shaft along the axial direction so as to form a tripod universal joint.

* * * * *